United States Patent [19]

Kohama et al.

[11] Patent Number: 4,513,627
[45] Date of Patent: Apr. 30, 1985

[54] TORQUE DETECTOR

[75] Inventors: Tokio Kohama, Nishio; Hideki Obayashi; Kimitaka Saito, both of Okazaki; Toshikazu Ina, Nukata; Seiichi Narita, Chiryu, all of Japan

[73] Assignees: Nippon Soken, Inc., Nishio; Nippondenso Co., Ltd., Kariya, both of Japan

[21] Appl. No.: 501,761

[22] Filed: Jun. 6, 1983

[30] Foreign Application Priority Data

Jun. 8, 1982 [JP] Japan .................................. 57-96875

[51] Int. Cl.³ ............................................. G01L 3/14
[52] U.S. Cl. .................................................. 73/862.34
[58] Field of Search ...................................... 73/862.34

[56] References Cited

U.S. PATENT DOCUMENTS 4,136,559  1/1979  Brown ............................. 73/862.34
4,235,101 11/1980  Stadelmann ........................... 73/116
4,352,295 10/1982  Maehara et al. ................. 73/862.34

Primary Examiner—Charles A. Ruehl
Attorney, Agent, or Firm—Cushman, Darby & Cushman

[57] ABSTRACT

A torque detector, for detecting a torque applied to a torque transmission shaft which is connected to a load of an automobile, comprises an elastic member which is interposed between a driving shaft and the torque transmission shaft so as to be connected thereto, rotating members, each of which is integrally provided with the shafts, have a plurality of teeth or notches in the outer periphery thereof so as to be positioned in each combustion stroke of each piston of an engine of the automobile, electromagnetic pickups for detecting the passing of the teeth or notches and a data processing circuit for calculating torque at a predetermined rotating angle from the angular phase difference between the above two shafts, the torque occurring due to the deformation of the elastic member caused by the increase or decrease of applied torque. The processing means adds the calculated torque in each combustion stroke of each piston and averages the added torque.

4 Claims, 10 Drawing Figures

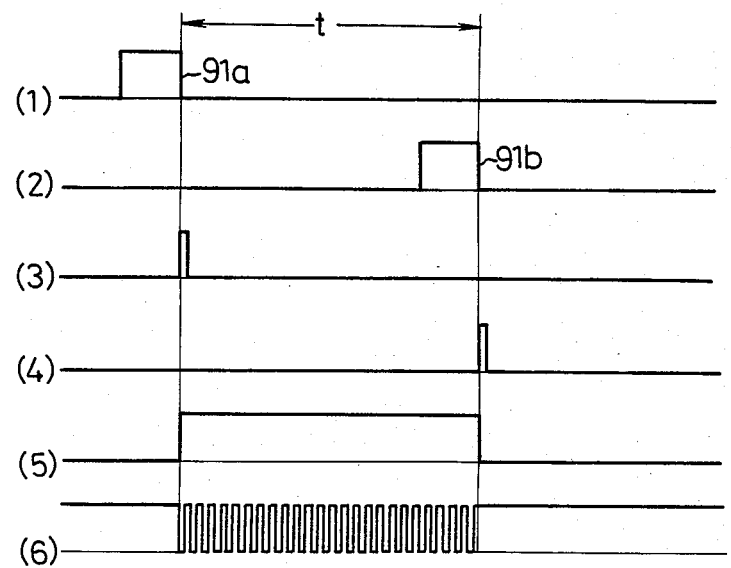

4,513,627

TORQUE DETECTOR

BACKGROUND OF THE INVENTION

The present invention relates to a torque detector, particularly to a torque detector for detecting a torque applied to a torque transmission shaft which is connected to a load such as a wheel of an automobile.

The conventional torque detector of this type is provided with a detector shaft of which one end is connected to a driving shaft of an engine and the other end is connected to the torque transmission shaft. In this torque detector, the torque applied to the torque transmission shaft is detected by detecting the distortion occurring in the above detector shaft.

The distortion of the above shaft is detected by a detecting means of a strain gauge type comprising a strain gauge in which electric resistance varies in proportion to the distortion, of a magnetic strain type comprising a magnetic strain pipe in which magnetic property varies in accordance with the distortion or of a phase difference type, which detects a phase difference between the distortion occurring at two separated points of the detector shaft.

However, the conventional torque detector having the above structure is large in size and complex in structure. Namely, in the conventional torque detector, the torque is detected by detecting distortion occurring in the detector shaft so that if the detector shaft is short, the accuracy of the detection is low. Therefore, in order to improve the accuracy of the detection, the detector shaft must be made long.

It has been required to control the ignition timing, the air-fuel ratio and the gear ratio of the transmission of the automobile in accordance with the torque applied to the load.

However, the above described conventional torque detector is too large and too complex in structure to be mounted on the automobile practically.

The torque applied to the torque transmission shaft pulsates simultaneously with each combustion stroke of each piston of the cylinders of the internal combustion engine. Therefore, the torque detector is required to detect the average torque in each combustion stroke of each piston of the engine.

Accordingly, one object of the present invention is to provide a torque detector which is small in size and simple enough in structure to be mounted on an automobile.

Another object of the present invention is to provide a torque detector which detects torque with excellent accuracy.

Still another object of the present invention is to provide a torque detector by which the average torque in each combustion stroke of each piston of an engine can be obtained easily.

SUMMARY OF THE INVENTION

The torque detector of the present invention comprises an elastic member which is interposed between a driving shaft and a torque transmission shaft of an internal combustion engine so as to be connected thereto, rotating members, each of which is integrally provided with the shafts and each of which has a plurality of teeth or notches in the outer periphery thereof so as to be positioned during each combustion stroke of each piston of the engine so that each of the teeth or notches of one rotating member are opposed to each of the teeth or notches of the other rotating member, detecting means for detecting the passing of the teeth or notches and a data processing means for calculating torque at a predetermined rotating angle from the angular phase difference between the above two shafts, occurring due to the deformation of the elastic member caused by the increase or decrease of applied torque, adding the calculated torque in each combustion stroke of each piston of the engine and averaging the added torque.

According to the torque detector of the present invention, a long detector shaft for detecting the distortion thereof need not be interposed between the driving shaft and the torque transmission shaft so that the applied torque can be precisely detected by a compact device. Therefore, the torque detector of the present invention can be mounted on an automobile as a means for controlling the air-fuel ratio, ignition timing and gear ratio of the transmission thereof.

Furthermore, according to the present invention, the calculated torques are added and averaged in each combustion stroke of each piston of the engine, so that a stable detected value of torque can always be obtained.

DESCRIPTION OF THE DRAWINGS

FIG. 9 is a waveform diagram showing the operation timing of the phase difference detecting circuit.

DETAILED DESCRIPTION OF EMBODIMENTS

Hereinafter, the present invention will be explained in detail in accordance with embodiments thereof with reference to the accompanying drawings.

Figure 1:
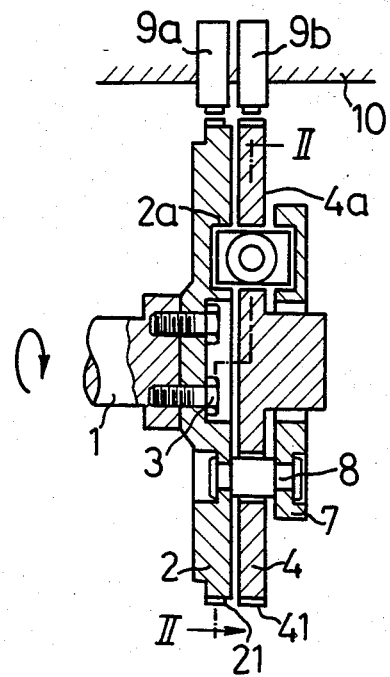
FIG. 1 is a longitudinal sectional view of a first embodiment of a torque detector according to the present invention.

FIG. 1 is a longitudinal sectional view of a torque detector according to the present invention.

Figure 2:
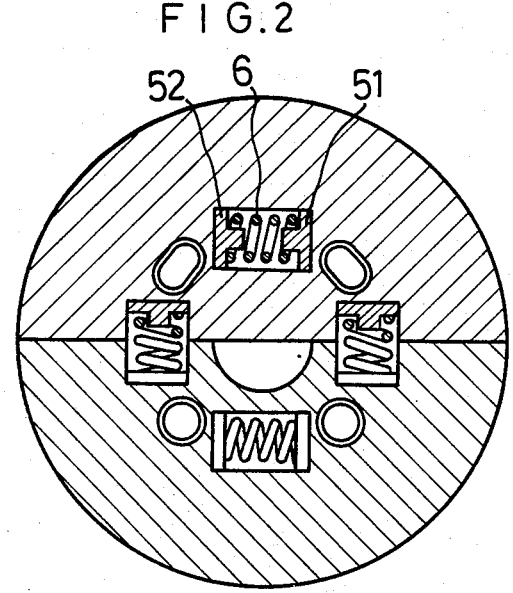
FIG. 2 is a transverse sectional view taken along the line II—II of FIG. 1.

FIG. 2 is a cross sectional view taken along the line II—II of FIG. 1.

A crank shaft 1 of an internal combustion engine (not shown) is connected to a first rotating body 2 by means of bolts 3 so as to be rotated thereby. The reference numeral 4 is a second rotating body which is connected to a clutch of a hand-operated gear transmission (not shown) or a torque converter of an automatic transmission (not shown).

In each of the first rotating body 2 and the second rotating body 4, four elastic member receiving portions 2a or 4a are provided so as to be opposed to each other.

Within each of the elastic member receiving portions 2a and 4a, an elastic member 6, of which both ends are supported by elastic member supporting members 51 and 52, is inserted.

A sub-plate 7 is fixed to the first rotating body 2 through the second rotating body 4 by means of rivets 8 so as to sandwich the elastic members 6 therebetween. Therefore, the sub-plate 7 rotates with the first rotating body 2 while the second rotating body 4 rotates with the first rotating body 2 through the elastic members 6.

In this embodiment, the elastic members 6 are composed of springs.

In the outer peripheral portion of each of the first and the second rotating bodies 2 and 4, notches or teeth 21 or 41 are formed.

Figure 3A:
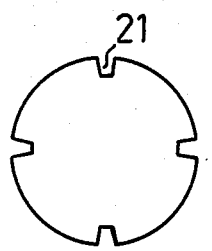
FIGS. 3(a) and 3(b) are views showing examples of a rotating member employed in the torque detector according to the present invention.
Figure 3B:
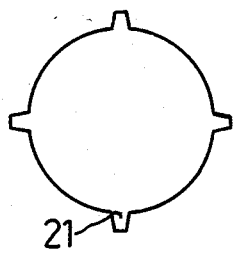
Figure 4:
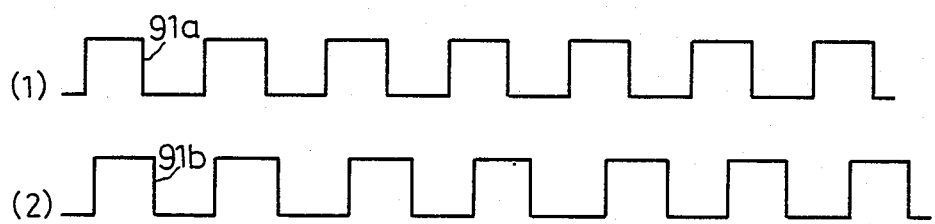
FIG. 4 is a waveform diagram of output signals.

FIGS. 3(a), 3(b) illustrate examples of the rotating body. As shown in FIGS. 3(a), 3(b), the notches or teeth are provided at predetermined angular distances in the circumferential direction of the rotating body. In order to detect the average torque in each combustion stroke of each piston of an engine, these notches or teeth are formed around each of the rotating bodies 2 and 4 so that a plurality of notches or teeth are positioned in each combustion stroke of each piston. When the rotating body shown in FIG. 3(a), 3(b) is applied to a four cycle-four cylinder engine, two notches or teeth exist in each combustion stroke of each piston.

These notches or teeth are preferably formed so that one of them corresponds to a predetermined position in each combustion stroke of each piston of the cylinders of the engine (for example, the top dead center thereof). And a first electromagnetic detecting element 9a and a second electromagnetic detecting element 9b are mounted to the housing 10 so as to be opposed to the above one of teeth or notches.

As these electromagnetic detecting elements 9a and 9b, electromagnetic pickups, each of which is comprised of a permanent magnet and a coil, are used, for example.

Figure 5:
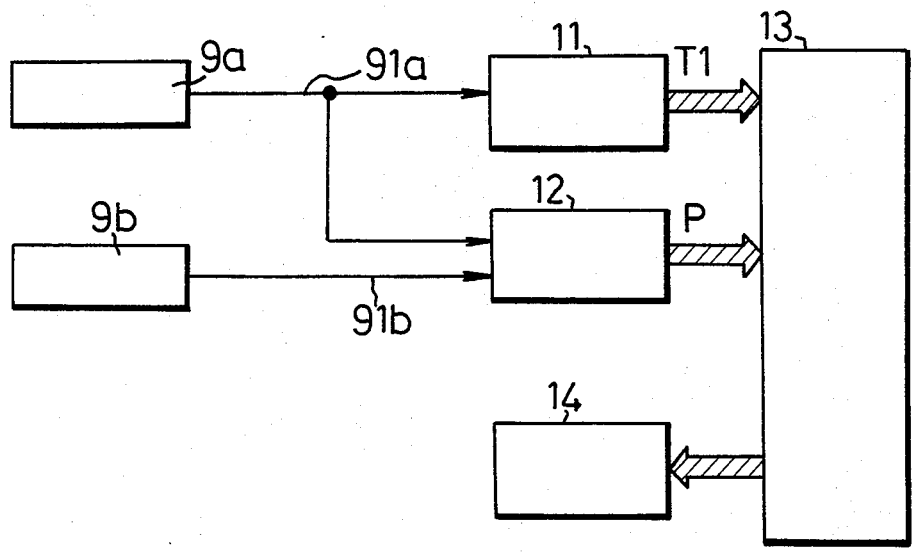
FIG. 5 is a block diagram of an angular phase difference detecting means and a data processing circuit.

FIG. 5 is a block diagram of the angular phase difference detecting means and the data processing means of the present invention.

A rotating speed counting circuit 11 is electrically connected to the electromagnetic pickup 9a and a phase difference detecting circuit 12 is electrically connected to the electromagnetic pickups 9a and 9b.

The rotating speed counting circuit 11 and the phase difference detecting circuit 12 are electrically connected to a microcomputer 13 as the data processing circuit, respectively. And the data processing circuit 13 is electrically connected to an indicating circuit 14.

In operation, the output signal 91a detected by the pickup 9a is fed to the rotating speed counting circuit 11 while the output signals 91a, 91b detected by the pickups 9a, 9b are fed to the phase difference detecting circuit 12.

The rotating speed counting circuit 11 feeds digital data $T_1$ which is proportional to the period of the output signal 91a and is inversely proportional to the rotating speed N, to the data processing circuit 13.

The phase difference detecting circuit 12 feeds digital data P which is proportional to the phase difference between the output signals 91a, 91b, to the data processing circuit 13.

The data processing circuit 13 calculates the torque from the digital data $T_1$ and P, adds the calculated torques every cycle of the engine and averages the total amount of calculated torques, and the obtained average torque is indicated by the display circuit 14.

Figure 6:
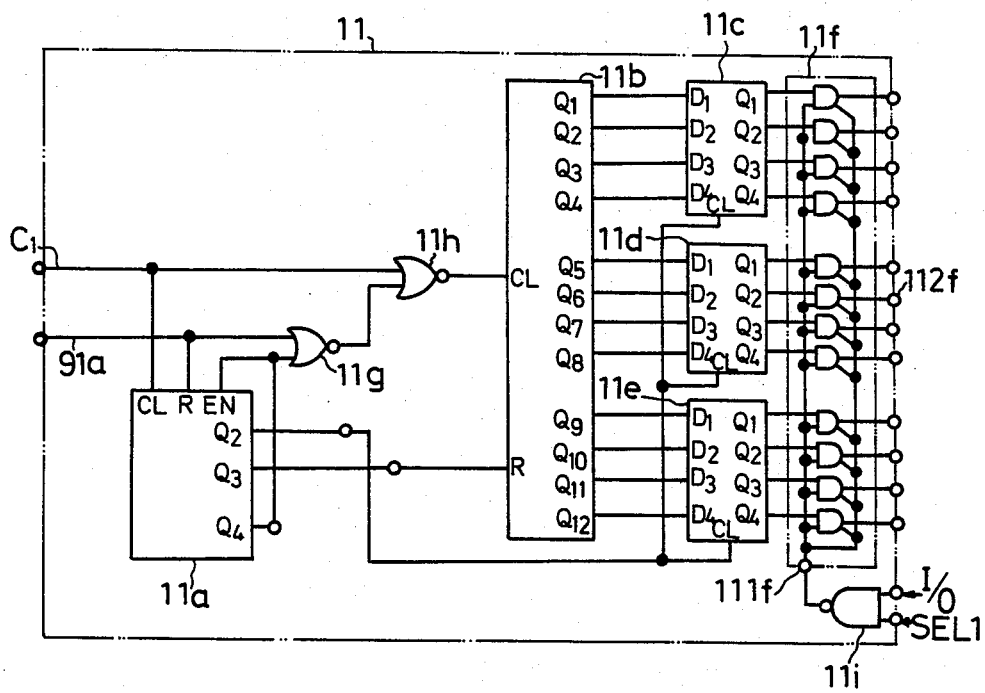
FIG. 6 is a circuit diagram of a rotating speed counting circuit composing the angular phase difference detecting means.

FIG. 6 is a circuit diagram of the rotating speed counting circuit 11.

The reference numerals 11a, 11b designate counters, 11c, 11d, 11e designate shift registers and 11f designates a three-state buffer.

The counter 11a comprises a clock terminal CL, a reset terminal R, a counter enable terminal EN, and output terminals $Q_2$ to $Q_4$.

The output terminal $Q_4$ is connected to the counter enable terminal EN.

To the clock terminal CL, a clock pulse signal $C_1$ is applied and the counter 11a counts the clock pulse signal $C_1$. When the output signal from the output terminals $Q_4$ is "1" level, the "1" level signal is fed to the counter enable terminal EN to stop the counting operation of the counter 11a.

Figure 7:
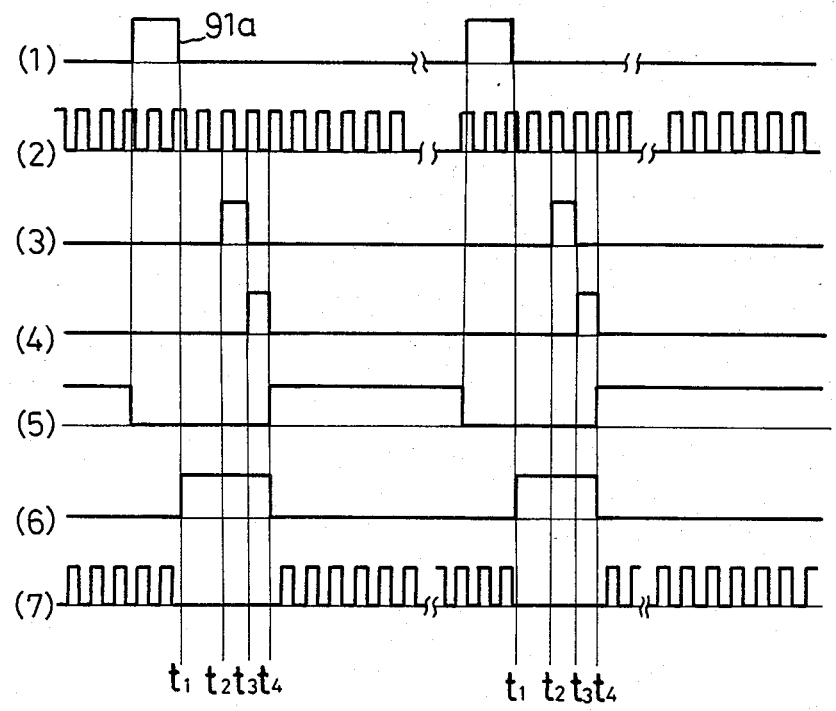
FIG. 7 is a waveform diagram showing the operation timing of the rotating speed counting circuit.

When the signal 91a shown in FIG. 7(1) is fed to the reset terminal R, the counter 11a is reset so that the output signal from the output terminal $Q_4$ is changed into "0" level as shown in FIG. 7(5).

When the signal 91a is changed into "0" level, the counter 11a starts the counting operation to generate the pulse signals shown in FIGS. 7(3), 7(4) from the output terminals $Q_2$, $Q_3$ in order.

When the output signal from the output terminal $Q_4$ is turned "1" level, the counter 11a stops the counting operation, again.

The counter 11b comprises a clock terminal CL, a reset terminal R and output terminals $Q_1$ to $Q_{12}$ which are electrically connected to input terminals $D_1$ to $D_4$ of each of shift registers 11c, 11d, 11e, respectively.

The output signal from the output terminal $Q_4$ of the counter 11a and the signal 91a are fed to a NOR gate 11g and the NOR gate 11g feeds a pulse signal shown in FIG. 7(6) to a NOR gate 11h.

The clock pulse signal $C_1$ shown in FIG. 7(2) is also fed to the NOR gate 11h. The NOR gate 11h feeds a pulse signal shown in FIG. 7(7) to the clock terminal CL of the counter 11b.

The output signal from the output terminal $Q_3$ of the counter 11a is fed to the reset terminal R of the counter 11b.

The output signal from the output terminal $Q_2$ of the counter 11a is fed to a clock terminal CL of each of the shift registers 11c, 11d, 11e.

The counter 11b stops the counting operation at the time $t_1$ when the signal 91a shown in FIG. 7(1) is changed into "0" level and the output signal from the NOR gate 11g shown in FIG. 7(6) is changed into "1" level.

Thereafter, the output signal from the output terminals $Q_1$ to $Q_{12}$ of the counter 11b are temporally memorized by the shift registers 11c to 11e at the time $t_2$ when the output signal from the output terminal $Q_2$ of the counter 11a is changed into "1" level.

Next, at the time $t_3$ when the output signal from the output terminal $Q_3$ of the counter 11a is changed into "1" level, the counter 11b is reset and at the time $t_4$ when the output signal from the output terminal $Q_4$ of the counter 11a is changed into "1" level, the counter 11b starts the counting operation, again.

The counter 11b continuously feeds output signals (counted data) to the shift registers 11c, 11d, 11e so as to synchronize with the output signal 91a from the pickup 9a.

Each of the shift registers 11c to 11e feeds digital data $T_1$ which is proportional to the pulse period of the output signal 91a, namely the reciprocal of rotating speed (1/N) of the shaft 1, from the output terminals $Q_1$ to $Q_4$ to a three-state buffer 11f.

The control terminal 111f of the three-state buffer 11f is connected to a NAND gate 11i.

To the NAND gate 11i, an input and output control signal (hereinafter will be called I/O signal) and a device select signal (SEL 1) are applied from a device control unit (DCU) of the microcomputer 13.

When the output signal of the NAND gate 11i is changed into "0" level, digital data $T_1$ which is proportional to the reciprocal of rotating speed is fed from the output terminals 112f to the microcomputer 13.

In this circuit, a well known quartz clock of about 524 KHz is used to feed a clock pulse signal.

Figure 8:
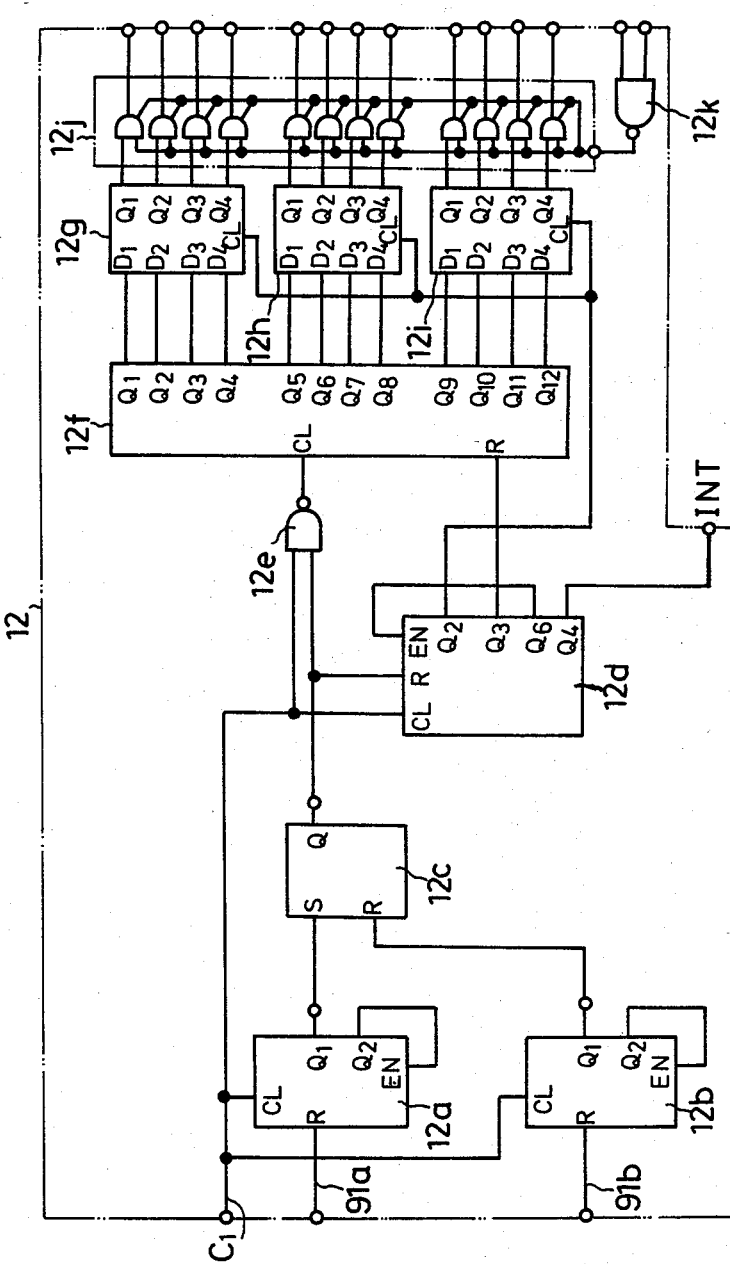
FIG. 8 is a circuit diagram of a phase difference detecting circuit composing the angular phase difference detecting means.

FIG. 8 is a circuit diagram of the phase difference detecting circuit 12.

The reference numerals 12a, 12b, 12d, 12f designate counters, 12c designates a R-S flipflop, 12g, 12h, 12i designate shift registers and 12j designates a three-state buffer.

The counter 12d is similar to the counter 11a shown in FIG. 6. The EN terminal of the counter 12d is connected to the output terminal $Q_6$ thereof. From the output terminal $Q_4$, an interrupt signal INT is supplied to the microcomputer 13.

The signals 91a, 91b shown in FIGS. 9(1), (2) are fed to the reset terminals R of the counters 12a, 12b, respectively. The counters 12a, 12b feed pulse signals shown in FIGS. 9(3), 9(4) from the output terminals $Q_1$ thereof to the S terminal and the R terminal of the R-S flipflop 12c, respectively.

The R-S flipflop 12c feeds a pulse signal shown in FIG. 9(5) of which "1" level is kept for a time t corresponding to the phase difference between the signals 91a, 91b, from the output terminal Q to the NAND gate 12e.

While the pulse signal from the R-S flipflop 12c is "1" level, the NAND gate opens to feed a clock pulse signal $C_1$ shown in FIG. 9(6) to the clock terminal CL of the counter 12f.

Next, the shift registers 12g to 12i, the three-state buffer 12j and a NAND gate 12k operate in the same manner as explained on the operation of the rotating speed counting circuit 11 to feed digital data P which is proportional to the time t corresponding to the phase difference between the output signals 91a, 91b, to the microcomputer 13.

The microcomputer 13 memorizes the digital data $T_1$ which is applied from the rotating speed counting circuit 11 and the digital data P which is applied from the phase difference detecting circuit 12 in an inside memory (RAM) every time when the interrupt signal INT is supplied from the counter 12d.

Then, the microcomputer 13 calculates the torque from the memorized data.

The microcomputer 13 need not operate so as to be synchronized with the rotating speed counting circuit 11 and the phase difference detecting circuit 12 since each of the circuits 11, 12 is provided with a latch circuit.

In order to improve the accuracy, the microcomputer 13 should be operated so as to receive input signal when the circuits 11, 12 receive input signals as described above.

According to the present invention, any device can be used as a display circuit 14. For example, a 7 segment LED is used as a digital display circuit and a D/A converter is used as an analogue display circuit.

In operation, when the load torque is applied, the spring 4 is compressed in accordance therewith so that the phase of the signal 91b delays from that of the signal 91a.

The shaft torque T is expressed by the following equation:

$$T = K_1 \cdot N \cdot P = K_2 \cdot (1/T_1) \cdot P$$

wherein $K_1$, $K_2$ are constant, N is a rotating speed, P is digital data fed from the phase difference detecting circuit 12 and $T_1$ is digital data fed from the rotating speed counting circuit 11.

The value N·P is proportional to the angular phase difference of the shafts 1, 2.

From the above equation, the shaft torque T can be calculated from the data $T_1$ and P by the microcomputer 13.

Then, the values of calculated torque (T) are added and averaged in each combustion stroke of each piston of engine in the microcomputer 13, and the obtained average torque (Tav.) is indicated by the display circuit 14.

When n teeth or notches are formed in each of the first rotating body 2 and the second rotating body 4, the average torque (Tav.) which is obtained in each combustion stroke of each piston of engine is expressed by the following equation:

$$Tav. = \frac{1}{n} \sum_1^n T$$

The data processing circuit of the present invention can obtain the average torque in each combustion stroke of each piston of the engine by only performing the above calculation. When the rotating body as shown in FIGS. 3a, 3b is applied to a four cycle four cylinder engine n is 2.

According to the present invention, a plurality of notches or teeth is formed in each of the rotating bodies which rotates with the engine, so as to be positioned in each combustion stroke of each piston of an engine and so that each of the teeth or notches of the first rotating body are opposed to each of the teeth or notches of the second rotating body.

And the detected torques are added in each combustion stroke of each piston of the engine and the added amount of torques are averaged. As a result, stable average torque in each combustion stroke of each piston can be obtained.

What is claimed is:

1. A torque detector comprising:
    (1) a first rotating member integrally connected to a driving shaft of an internal combusion engine so as to be rotated therewith;
    (2) a second rotating member integrally connected to a load, which is provided so as to be coaxially opposed to said first rotating member;
    each of said first and second rotating members being provided with a plurality of teeth or notches in the outer periphery thereof so as to be positioned in each combustion stroke of each piston of the engine, each of said plurality of teeth or notches formed in said first rotating member being opposed to each of said plurality of teeth or notches formed in said second rotating member;

(3) an elastic member for connecting the opposed ends of said first rotating member and said second rotating member;

(4) detecting means for detecting the passing of said teeth or notches of said first and second rotating member and generating pulse signals at the time when said detecting means detects the passing of said teeth or notches, which is provided so as to be opposed to the outer periphery of each of said first and second rotating members;

(5) a pulse phase difference detecting means for detecting pulse phase difference between said pulse signals;

(6) a rotating speed counting means for counting rotating speed of said engine;

(7) an angular phase difference detecting means for detecting angular phase difference between said first rotating member and said second rotating member from the pulse phase difference detected by said pulse phase difference detecting means, and the rotating speed counted by said rotating speed counting means; and (8) a data processing means for calculating torque from the angular phase difference, for adding calculated torque in each combustion stroke of each piston and for averaging the added torque.

2. A torque detector according to claim 1, wherein: said plurality of teeth or notches are formed in the outer periphery of each of said first and second rotating members at predetermined angular distances.

3. A torque detector according to claim 2, wherein: one of said plurality of teeth or notches formed in each of said rotating members is positioned so as to correspond to a predetermined position of each piston of said engine.

4. A torque detector according to claim 3, wherein: said one of said plurality of teeth or notches is positioned so as to correspond to the top dead center of each piston.

* * * * *